No. 768,760. Patented August 30, 1904.

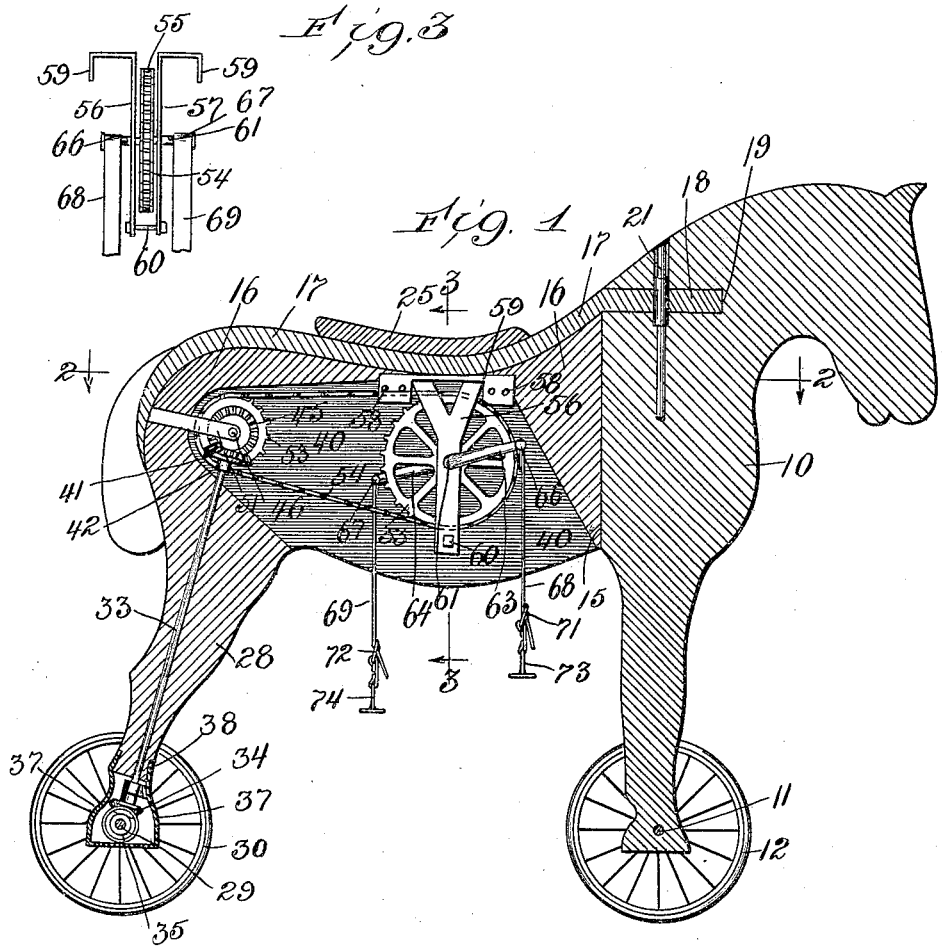

UNITED STATES PATENT OFFICE.

WILLIAM S. LA LONDE, OF CHICAGO, ILLINOIS.

TOY RIDING-HORSE.

SPECIFICATION forming part of Letters Patent No. 768,760, dated August 30, 1904.

Application filed February 23, 1904. Serial No. 194,830. (No model.)

*To all whom it may concern:*

Be it known that I, WILLIAM S. LA LONDE, a citizen of the United States, residing at Chicago, in the county of Cook and State of Illinois, have invented a new and useful Toy Riding-Horse, of which the following is a specification in its best form now known to me, reference being had to the accompanying drawings, in which similar numerals indicate the same parts throughout the several views.

My invention relates to children's toy horses, and particularly to riding-horses; and the object of my invention is to provide such a toy horse which can be propelled by the child while seated upon the back of the horse.

My invention consists in mechanism mounted within the body of the horse connected to the wheels on which the horse is mounted, so that the child can communicate motion to the wheels.

My invention also consists in such a horse which is neat and attractive in form, which can be easily and cheaply constructed, and which shall be efficient in operation and not liable to easily get out of order.

It further consists in many details of construction, which will be hereinafter more fully described and claimed as the specification proceeds.

Referring to the drawings, Figure 1 is a sectional central elevation through the body and legs of the horse, showing the application of my propelling mechanism thereto. Fig. 2 is a plan view taken on line 2 of Fig. 1. Fig. 3 is a sectional detail view taken on line 3 of Fig. 1, showing the method of attaching a portion of the propelling mechanism inside the body of the horse.

While it should be understood that the body of my toy horse may be made of any material, I have for convenience illustrated it as made largely of wood.

The numeral 10 indicates the head portion supported upon the two fore feet, in which I journal a shaft 11, on which are mounted one or two wheels 12. These wheels are not driven except as they rotate by tractive contact with the ground. The rear of the head portion 10 of the horse is cut away in a semicircular curve 15, adapted to fit in a corresponding curved recess in the main body 16.

In order to stiffen the device, the wooden body 16 of the horse has along its top a metallic plate 17, having its end 18 extending horizontally into a corresponding recess in the head portion 10 of the horse.

Through the center of the curvature of the semicircle 15, heretofore described, I place a king-pin 21, extending down into the head of the horse and through the metallic plate 18, as the head portion 10 fits into the semicircle 15, as heretofore described. The center of curvature of this curve 15 is the king-pin 21, on which the head of the horse is free to turn. The edges 23 of the body 16 are carried to such a point about the head portion 10 that the head portion mounted on wheels 12 may turn sufficiently to guide the toy horse in different directions without distorting the appearance of the horse at the point of connection. The rider seated upon the saddle 25, mounted upon the back of the horse, can turn the head upon the king-pin 21 either by taking hold directly of the head or by pulling upon lines or handle-bars (not shown) attached to the bridle of the horse.

Passing through the hoofs on the rear legs 27 and 28 is a shaft 29, on which are mounted wheels 30 and 31. One rear leg of the horse, as 28, has journaled within it an upright shaft 33, having on its lower end a bevel-gear 35, rigidly secured to said shaft 29. This gear is incased within a metallic hoof 37, detachably secured by bolts, screws, or other suitable means (not shown) to the leg 28 at 38.

Detachably mounted upon the upper end of the shaft 32 within a recess 40 and inside of the body of the horse is bevel-gear 41, the shaft 33 being secured to the gear 41 by screw-threads on the shaft engaging similar screw-threads in the hub or by being detachably secured by a cotter or similar means. (Not shown.) Engaging this bevel-gear 41 is another bevel-gear 45, standing in a substantially vertical plane within the recess 40 and mounted upon a shaft 46, which extends horizontally through the hips of the horse. This shaft 46 is secured in position by nuts 48 on its opposite ends reposing in recesses made in the body of the horse, said recesses being preferably filled up with putty, so as not to mar the surface of the outside of the horse. This shaft 46 is also supported by two brackets 50 and 51, rigidly secured to the rear portion of the inside of the body of the horse, as shown in Fig. 2. If desired, the shaft 46 may be made shorter and be supported by these brackets 50 and 51 and by brackets on either end placed wholly inside of the body of the horse. Rigidly secured to the shaft 46 between the brackets 50 and 51 is a sprocket-wheel 53, over which passes a sprocket-chain 54, connecting it with a driving sprocket-wheel 55.

Inside of the body of the horse below the saddle 25 I mount two brackets 56 and 57 and secure them to the upper portion of the inside of the body of the horse by bolts or screws 58 passing through lugs 59, extending from the sides of the brackets, as shown in Fig. 3, the distance between the opposite lugs 59 on the opposite brackets being the width of the opening 40 inside of the body of the horse. The lower ends of these brackets 56 and 57 are secured together by the bolts 60. Journaled in the brackets 56 and 57 is a shaft 61, having rigidly secured to it the driving sprocket-wheel 55. Mounted on opposite sides of this wheel 55 and on opposite ends of the shaft are crank-arms 63 and 64, as shown in Fig. 1. On the outer end of these crank-arms are crank-pins 66 and 67, from which are suspended straps or rods 68 and 69. Secured to the lower ends of the straps 68 and 69 by buckles 71 and 72 or other suitable adjustable means are stirrups 73 and 74, in which the feet of the child are adapted to fit. The distance between the crank-pins 66 and 67 should preferably be from three to six inches, so that the length of travel up and down of the stirrups 73 and 74 will not be too great for a small child seated upon the horse. The straps 68 and 69, just described, extend downward below the body of the horse through an opening which is large enough to permit the insertion inside of the body of the horse of the propelling mechanism described. The opening may be normally closed by a plate, if desired, and the straps then travel in slots in said plate.

In constructing the mechanism I take the body 16 of the horse and remove the metallic hoof 37 and shove the rod or shaft 33, connected at its bottom to the wheel 31, as heretofore described, through the proper opening in the leg 18 of the horse, as shown. I then attach to the upper end of the shaft the bevel-gear 41. After this is done I place in position the bevel-gear 45 and sprocket-wheel 53 and insert through them the shaft 46, securing it in position. I now take the driving sprocket-wheel 55, mounted upon the brackets 56 and 57, and secure the same in position by the insertion of the bolts or screws 58. I now place the sprocket-chain 54 over the sprocket-wheels 53 and 55 and attach to the crank-arms 63 and 64 the straps 68 and 69, carrying the stirrups 73 and 74. I now take the head portion of the horse and place it in proper position and insert the king-pin 21, heretofore described. When this operation is completed, the device is ready for sale and use.

In using the device of my invention, the child seats itself upon the saddle 25 and places its feet in the stirrups 73 and 74 and by simply moving the stirrups up and down rotates the sprocket-wheel 55, which communicates power through the sprocket-chain 54 to the sprocket-wheel 53, thence through the bevel-gears 45 and 41 to the shaft 33, thence through the bevel-gears 34 and 35 to the driving-wheels 30 and 31, thereby propelling the horse. If the child desires to stop the operation of the device, it has only to back pedal, and the mechanism will act as a brake. If this operation is continued, the horse will eventually be propelled backward. In the meantime the steering is carried on by turning the head portion of the horse upon the king-pin 21 as its center, as heretofore described.

I do not wish to be understood as limiting myself to the exact details of construction, which may be varied within reasonable limits without departing from my invention.

Having thus described my invention, what I claim as new, and desire to secure by Letters Patent, is—

1. In a hobby-horse, the combination of a body portion mounted on wheels, a bevel-gear upon the driving-wheel, another bevel-gear meshing with said first bevel-gear, a shaft secured to said second bevel-gear extending upward through a leg of the horse, a third bevel-gear upon the upper end of said shaft within the body of the horse and mechanism mounted within the body of the horse engaging said third bevel-gear adapted to be operated by a child seated upon the horse for communicating power through said bevel-gears and shafts to the driving-wheel.

2. In a hobby-horse, the combination of a body portion mounted on wheels, a bevel-gear mounted upon the driving-wheel, another bevel-gear meshing with the first-mentioned bevel-gear, a shaft secured to said second bevel-gear extending upward through a leg of the horse, a third bevel-gear upon the upper end of said shaft within the body of the horse, a fourth bevel-gear in engagement with said third bevel-gear, a shaft carrying said fourth bevel-gear, a sprocket-wheel upon said shaft, a sprocket-chain upon said sprocket-wheel mounted in the horse below the saddle connecting said sprocket-wheel to the main driving sprocket-wheel, and means adapted to be operated by a child seated on the horse, for propelling said main driving sprocket-wheel.

3. In a hobby-horse, the combination of a body portion mounted on wheels, a bevel-gear mounted upon the driving-wheel, another bevel-gear meshing with said first bevel-gear, a shaft secured to said second bevel-gear extending through a leg of the horse, a third bevel-gear upon the upper end of said shaft within the body of the horse, a fourth bevel-gear in engagement with said third bevel-gear, a shaft carrying said fourth bevel-gear, a sprocket-wheel upon said shaft, a sprocket-chain on said sprocket-wheel connecting said sprocket-wheel to the main driving sprocket-wheel mounted in the horse below the saddle, a shaft supporting said main driving sprocket-wheel, crank-arms rigidly secured to said shaft on opposite sides of said main sprocket-wheel, straps depending from said crank-arms below the body of the horse and stirrups upon said straps adapted to be engaged by the feet of a child seated upon the horse.

4. In mechanism of the class described, the combination of two parallel brackets adapted to be secured at their upper ends to the upper portion of the inside of the horse, a driving sprocket-wheel mounted on a shaft journaled in said brackets, crank-arms on opposite ends of said shaft the whole being contained within the body of the horse and straps depending from said crank-arms having stirrups on the lower ends thereof.

WILLIAM S. LA LONDE.

Witnesses:
    DWIGHT B. CHEEVER,
    BLANCHE L. WEST.